United States Patent [19]

Kastendieck et al.

[11] Patent Number: 4,741,608
[45] Date of Patent: May 3, 1988

[54] TURNING MIRROR FOR INTEGRATING IMAGE AND LIGHT INDICATOR RAY BUNDLES

[75] Inventors: William A. Kastendieck, Wylie; Paul B. Mattes; Steve D. Puckett, both of Garland, all of Tex.

[73] Assignee: Varo, Inc., Garland, Tex.

[21] Appl. No.: 872,274

[22] Filed: Jun. 9, 1986

[51] Int. Cl.$^4$ .................... G02B 23/10; G02B 27/10
[52] U.S. Cl. .................... 350/545; 350/538; 350/601
[58] Field of Search ............ 350/502, 538, 545, 562, 350/565–566, 600–601; 354/471–475; 351/158

[56] References Cited

U.S. PATENT DOCUMENTS

| | | | |
|---|---|---|---|
| 3,464,757 | 9/1969 | Schmidt et al. | 350/538 |
| 3,597,054 | 8/1971 | Winter | 351/158 |
| 4,000,419 | 12/1976 | Crost et al. | 350/538 |
| 4,090,506 | 5/1978 | Pilgrim | 350/601 |
| 4,204,756 | 5/1980 | Kobori et al. | 354/473 |
| 4,205,894 | 6/1980 | Filipovich et al. | 350/538 |

FOREIGN PATENT DOCUMENTS 3239766 5/1984 Fed. Rep. of Germany ...... 354/471

Primary Examiner—William H. Punter
Attorney, Agent, or Firm—Jerry W. Mills; Roger N. Chauza; Jefferson Perkins

[57] ABSTRACT

An electrical-optical system is disclosed having a turning mirror (24) for superimposing light rays (44) of an indicator LED (40) into the primary optical path (28) of an image (18). The turning mirror (24) comprises a solid having a frontal mirrored reflective surface (78) with a pinhole (80) etched therein. Offset from the pinhole (80), and disposed on the backside of the turning mirror (24) is a cavity (86) housing an LED indicator light (40). The light rays from the LED (40) pass through the pinhole (80) in such a direction as to be colinear with the image ray bundle (28) reflected from the mirrored surface (78).

23 Claims, 1 Drawing Sheet

TURNING MIRROR FOR INTEGRATING IMAGE AND LIGHT INDICATOR RAY BUNDLES

TECHNICAL FIELD OF THE INVENTION

The present invention relates in general to optical apparatus, and more particularly relates to electro-optical equipment for presenting to a viewer an image of an object and a visual indication of a condition of the electrical circuit.

BACKGROUND OF THE INVENTION

The sophistication and miniaturization of electrical apparatus have made possible features which have not heretofore been commercially achievable. For example, because low power and compact circuits are now available, cameras and other optical equipment can be completely electrically controlled. Moreover, with the integration of electrical and optical equipment, the convenience and ease of use is optimized.

In some types of optical equipment, it is most convenient, if not necessary, to optically provide the observer while using the equipment, indications of the conditions of various parameters associated with the equipment. For example, military personnel wearing night vision goggles would find it highly convenient to know if the batteries powering the electrical circuits of the goggle have become discharged beyond a predetermined voltage level. Moreover, the utmost advantage can be had with such equipment if a visual indication of the low voltage condition is presented to the goggle-wearer in the regular field of view, together with the object observed. In this manner, the goggle-wearer will automatically notice the visual indication without having to press a button or otherwise perform a deliberate act to check the voltage status of the battery.

Various approaches have been taken in the art for providing a user with visual indications of various parameters of the condition of electrical circuits of the equipment. For instance, in many photographic cameras it is common to mount a light source, such as a Light Emitting Diode (LED) internal to the camera, but out of the normal field of view. The person must then make a deliberate effort to look at a particular spot for the LED indication. While the size and space requirements of a camera are not particularly critical, this is not so, for example, in night vision equipment where the equipment must be lightweight and compact. Because of the compactness and lensing arrangement in night vision equipment, there is limited room internally for fixing light indicators indicating the status of the battery or of infrared lamps. Some attempts have been made to provide visual indicators within the goggle equipment, but again out of the field of view. This often required the user to rearrange the goggle or cant it so that the indicator could be seen.

There also exists image splitters with partially reflecting surfaces for integrating one ray bundle with another. U.S. Pat. Nos. 4,274,092 and 4,544,243 are exemplary of this approach. The problem attendant with the user of conventional image splitters is that the reflective surfaces thereof are only partially reflective so that light from one source can be transmitted through the splitter, while the light incident from the other source can be reflected therefrom. A significant amount of the light incident to the reflecting surface is transmitted therethrough, and thus not reflected. The intensity and quality of the image transferred is thereby reduced by the use of such image splitters.

It can be seen from the foregoing that a need exists for a method and apparatus for efficiently integrating a ray bundle comprising an object image, and a ray bundle comprising a visual indication of a desired electrical parameter.

SUMMARY OF THE INVENTION

In accordance with the present invention, a dual ray bundle optical integrator is provided which substantially reduces or eliminates the shortcomings associated with the corresponding prior art devices.

In accordance with the optical integrator of the invention, a glass solid having a highly reflective surface is placed in a primary optical path through which an object image is transferred. A pinhole is formed in the mirrored surface forming a secondary optical path for transferring a small ray bundle, the presence or absence of which indicates the condition of an electrical circuit. The small ray bundle is superimposed in the primary optical path in a colinear manner.

An LED indicator light is mounted on the backside of the reflective solid with respect to the pinhole, and in such a position that light is transmitted from the LED through the pinhole and emitted from the front side of the solid colinear with the reflected primary optical path. In the preferred form of the invention, a cavity or bore is formed on the backside of the solid with an axial axis thereof offset somewhat from the pinhole in the mirrored frontal surface, thereby providing alignment of the LED light source with the reflected primary optical path.

When used in connection with an optical system having imaging lenses which focus an image incident to the reflective surface, the pinhole is located so that the LED light emitted therefrom, forming the secondary optical path, is integrated or superimposed into the reflected primary optical path at a peripheral location within the primary optical path. With this arrangement, the secondary optical path is spaced from the central part of the primary optical path so as not to interfere with the viewing of the object.

In the preferred form of the invention, the pinhole is formed by etching a 0.010 inch diameter area near the edge of the mirrored reflective surface of the glass. Thus, when the LED light source is not illuminated, the pinhole is hardly noticeable and thus does not degrade the quality of the image transferred in the primary optical path.

BRIEF DESCRIPTION OF THE DRAWINGS

Further features and advantages of the present invention will be apparent from the following and more particular description of the preferred embodiment of the invention, as illustrated in the accompanying drawings in which like reference characters refer to the same parts throughout the views, and in which.

DETAILED DESCRIPTION OF THE INVENTION

Figure 1:
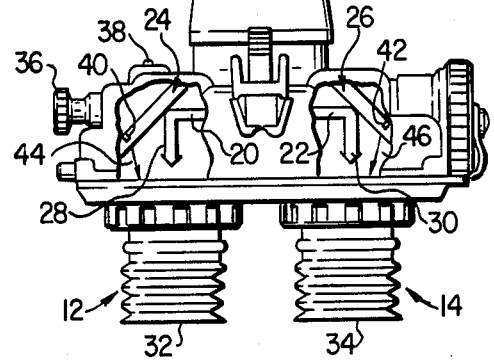
FIG. 1 is a top view of optical apparatus with portions thereof removed to illustrate the placement of the turning mirrors.
Figure 3:
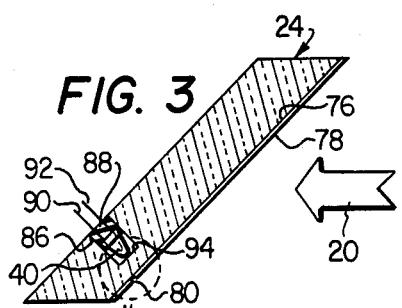
FIG. 3 is a cross-sectional view illustrating in detail the combination LED and turning mirror.
Figure 4:
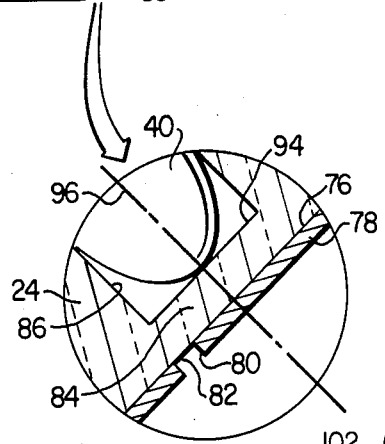
FIG. 4 illustrates in further detail a partial sectional view of the turning mirror and the placement of the LED cavity with respect to the pinhole in the mirrored surface.

The principles and concepts of the invention are best understood by referring first to FIG. 1 where there is illustrated a typical application of the invention. Particularly, a binocular or goggle 10, such as commonly utilized in night vision equipment is shown, and includes a pair of eyepieces 12 and 14 through which individual images may be seen by the eyes of an observer. The goggle 10 is directed toward an object so that the image 16 thereof is introduced into a frontal opening 18 of the device. Depending upon the type of optical apparatus involved, the image 16 may be processed by various lenses and other equipment such as collimators, image intensifier tubes, image splitters, etc. Reference is here made to a co-pending application, Ser. No. 884,731, filed July 11, 1986 and entitled Triple Prism for Image Splitter for an example of the construction of a goggle having night vision capabilities.

While not specifically shown in FIG. 1, the goggle 10 includes an image splitter for splitting the image 16 into oppositely directed lateral primary optical paths 20 and 22. A pair of turning mirrors 24 and 26 are disposed in the respective primary optical paths 20 and 22 so as to redirect the split image 18 into parallel reflected primary optical paths 28 and 30. Yet other lenses and optical correcting equipment (not shown in FIG. 1) may be disposed within the parallel reflected primary optical paths 28 and 30 to further condition the quality of the split images before such images exit the goggle 10 through the respective eyepieces 12 and 14. A pair of flexible eye cups 32 and 34 generally conform to an observer's facial features to prevent outside ambient light from entering the binocular.

In accordance with battery-operated goggles, a multi-position OFF/ON switch 36 is provided for activating the functions of the goggles 10. Typically, the OFF position of the switch 36 removes battery power from the circuits of the goggle 10, while the ON position activates such circuits. Among other things, the circuits power an image intensifier tube so that night vision is possible. In addition, an IR (InfraRed) switch position is provided to illuminate an infrared light source 38. The IR lamp 38 emits non-visible light which can be seen only by using the night vision capabilities of the goggle 10. The IR light 38 can be used for lighting the path of a soldier, or for reading a map at nighttime. However, it is highly important that the use of the IR lamp 38 be limited to areas which cannot be observed by enemy troops who may also be equipped with night vision apparatus. Thus, the ability to monitor whether the IR lamp 38 is on or off is of utmost importance.

The type of goggle 10 as described above is conventionally available. According to the invention, there is provided a pair of visible light indicators 40 and 42 constructed integral with the respective turning mirrors 24 and 26 for integrating light therefrom into the reflected primary optical paths 28 and 30. The light emitted from the light indicators 40 and 42 is illustrated as ray bundles 44 and 46 forming respective secondary optical paths. While shown as separate secondary optical paths 44 and 46, the ray bundles emitted from the visible light indicators 40 and 42 are actually superimposed within the respective parallel reflected primary optical paths 28 and 30.

Figure 2:
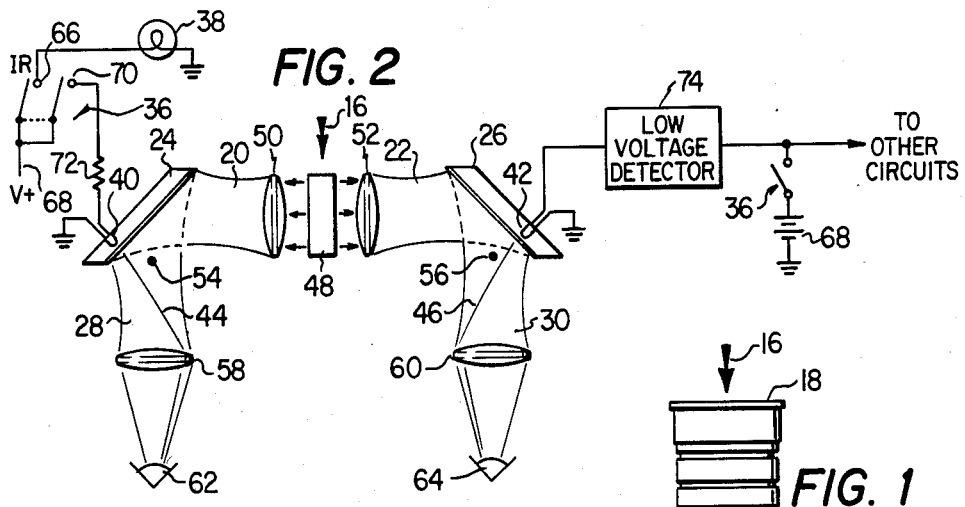
FIG. 2 is a simplified optical diagram illustrating the LED monitor lights fixed in the respective turning mirrors for integrating the LED light into the reflected primary optical image paths.

In FIG. 2, the principles and concepts of the invention are shown in more detail. The image 16 of an observed object is split by an image spitter 48 and redirected outwardly toward a pair of lenses 50 and 52. The lenses 50 and 52 are disposed in the primary optical paths 20 and 22 and focus the images toward the respective turning mirrors 24 and 26. The incident optical path 20 and the reflected optical path 28 illustrate the general envelope of the respective ray bundles. The virtual focal points of the images are represented generally by reference characters 54 and 56. A corresponding pair of lenses 58 and 60 are disposed in the parallel reflected primary optical paths for providing a pair of focused images to the eyes 62 and 64 of the observer.

In accordance with the preferred form of the invention, the visible light indicator 40 is a semiconductor LED of the type which emits light in the red portion of the visible spectrum. When illuminated, the LED indicator 40 provides a ray bundle 44 coplanar with that of the parallel reflected primary optical path 28. As a result, the eye 62 of the observer can see the LED light ray bundle 44 superimposed over a portion of the image transferred through the reflected primary optical path 28. LED indicator 40 can be electrically controlled by ganged sections of the electrical switch 36. One section 66 of the switch 36 is connected between a supply voltage 68 and the IR light source 38. When the electrical switch 36 is rotated to the IR position, a current path is provided between the supply voltage 68 and ground, thereby illuminating the IR light source 38. Switch 36 also includes a section 70 which is ganged to section 66 so that when the IR light source 38 is illuminated, a current path is supplied through resistor 72 to ground, through the LED indicator 40. Therefore, when the switch 36 is rotated to the IR position, the LED indicator 40 provides a visual indication to the eye 62 of the observer that the IR light source 38 is illuminated. This is advantageous from two standpoints. First, the condition of the IR light source can be determined without removing the night vision goggle, and secondly, since the IR light is nonvisible, the LED 40 provides a visible indication thereof.

In accordance with the invention, another visual indication of an electrical parameter can be provided to the other eye 64 of the observer by another LED light indicator 42 fixed in turning mirror 26. The LED indicator 42 is shown connected to the supply voltage 68 through a low voltage detector 74. The low voltage detector is of conventional design for providing an output voltage when the battery 68 is discharged below a predetermined voltage level. When such a level is detected, the low voltage detector 74 provides an output voltage which is sufficient to drive LED indicator 42, thereby illuminating the LED and superimposing the corresponding ray bundle 46 into the reflected primary optical path 30.

Figure 7:
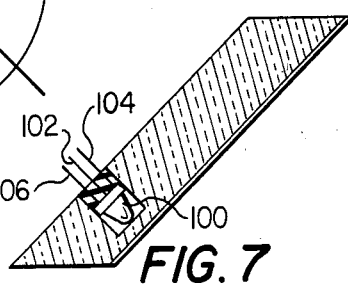
FIG. 7 is a cross-sectional view of the turning mirror of the invention, illustrating an alternative LED monitor light.

While FIG. 2 illustrates an IR indication and low voltage parameter integrated into the respective optical paths 28 and 30, other parameters may be monitored and displayed in a similar manner. It is contemplated that those skilled in the art can readily utilize a two-element LED indicator and provide dual visual indications of two parameters superimposed into a single primary optical path. Indeed, LED indicators are available with two elements, each emitting light of a different color. In this manner, simultaneous indications of two parameters can be provided in one of the reflected primary optical paths 28 or 30. Such a two-element LED indicator is shown at 100 in FIG. 7. The LED indicator includes a common ground wire 102, a first signal wire 104 for, e.g., a low-voltage indicator signal, and a second signal wire 106 for, e.g., an infrared indicator signal.

The manner in which the light ray bundles 44 and 46 are integrated with the respective parallel reflected primary optical paths 28 and 30 is shown in detail in FIGS. 3–6. For convenience, the optical construction and characteristics of turning mirror 24 will be described below, it being understood that the turning mirror 26 is similarly constructed. The turning mirror 24 is constructed of a solid, comprising a conventional optical quality glass. The glass is of sufficient thickness to provide strength and durability to the turning mirror 24. The frontal surface 76 of the turning mirror is highly polished, and then coated with a conventional opaque, but reflective material to provide a low transmissive and highly reflective mirror surface. The mirror surface 78 should provide maximum reflectivity to light incident to the turning mirror 24 at angles of about 45 degrees. Moreover, the reflective coating of the mirror surface 78 should reflect light at wavelengths of interest, namely, 5500–8300 angstroms for night vision equipment. The mirror coating 78 is shown in detail in FIG. 4.

A pinhole 80 is etched at a desired location into the mirror surface 78. The mirror surface 78 is etched down to the frontal surface 76 of the glass structure of the turning mirror 24. In the area 84 of the glass solid the turning mirror 24 is transparent to light rays passing therethrough. The entire surface area of the turning mirror 76 surrounding the pinhole 80 is otherwise opaque to light. The majority of light from the primary optical path 22 is thereby reflected, rather than being lost by transmittance through the glass of the turning mirror 24. With the use of the present invention, maximum reflection efficiency of the light is attained as it is routed along the primary optical paths.

The pinhole 80 has minimal effect on the reflection of the image 18 along the primary optical path 28, as the pinhole 80 is only about 0.010 inch in diameter. While the reflective surface 78 of the turning mirror 24 is elliptical in shape, the minor axis thereof is about 0.75 inches. The surface area of the pinhole 80 is thus only a fraction of that of the frontal surface 76 of the turning mirror 24. Indeed, the surface area of the pinhole is less than 0.1 percent of the total mirrored surface area 78 of the turning mirror 24.

A cavity or bore 86 is formed within the glass solid on the backside of the turning mirror 24. The LED indicator 40 is then placed within the cavity 86 and fixed therein by pouring a thick potting compound 88 thereover. The compound 88 then solidifies and makes the LED 40 integral to the turning mirror 24. The electrical leads 90 and 92 of the LED 40 extend beyond the potting compound 88 and are thus accessible to be connected to the monitor circuitry as described above. The diameter of the cavity 86 is only slightly oversized with respect to that of the LED indicator 40 such that the indicator can be snugly inserted into the cavity. Since the potting compound 88 constitutes a thick RTV material, it cannot fill in the bottom of the cavity 86 and obstruct the passage of light from the LED 40 through the pinhole 80.

In the preferred embodiment of the invention, the bottom of the cavity is formed within about 0.050 inch of the frontal surface 76 of the glass body of the turning mirror 24. Moreover, the cavity 86 includes an axis 96 laterally displaced from the pinhole 80 formed in the mirrored surface 78. The distance separating the pinhole 80 from the cavity axis 96 is about 0.046 inch. The displacement of the cavity 86 with respect to the pinhole 80 permits light emitted from the LED indicator 40 to pass through the transparent glass area 84, the pinhole 80 and be integrated within the reflected primary optical path 28. It is essential that the pinhole 80 be located with respect to the light emitting element of the LED 40 such that the ray bundle of the secondary optical path 44 exits the turning mirror 24 colinear with the rays of the primary optical path 28 which are reflected from the mirrored surface 78 proximate the pinhole 80. In this manner, the superimposed primary and secondary ray bundles 28 and 44 maintain their spatial relationship when passed through the lens 58 and converged toward the eye 62 of the observer.

Figure 5:
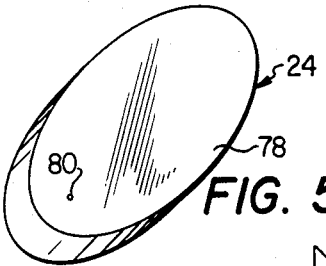
FIG. 5 is a frontal view of the mirrored surface of the turning mirror of FIG. 3.

The spatial relationship of the image carried by the reflected primary optical path 28 and the LED light of the secondary optical path 44 are not symmetrical, but rather have displaced axes. FIG. 5 is a frontal orthogonal view of the turning mirror 24, illustrating the placement of the pinhole 80 etched within the mirrored surface 78. While the location of the pinhole 80 can be placed at any arbitrary position on the reflective mirror surface 78, the placement thereof in a peripheral position provides certain advantages. For example, an observer normally positions the binocular or goggle 10 with respect to an object such that the object is presented as centrally located images in the eyepieces. Maximum resolution of the image is thereby attained.

It is preferable to present the ray bundle of the LED 40 in a peripheral position within the field of view of the image so as not to detract from the object observed. However, this still allows the LED light bundle of the secondary optical path 44 to be easily noticed by the observer without purposefully looking at other locations internal to the goggle 10. In the preferred embodiment of the invention, the pinhole 80 is located generally near the outer one-third peripheral area of the observer's field of view. In actual practice, the frontal surface 76 of the turning mirror 24 is elliptical so as to collect a maximum number of light rays from the cylindrical incident primary optical path 20, and redirect the rays into a reflected cylindrical optical path 28.

Figure 6:
FIG. 6 is a view, as seen by an observer, of the secondary optical path of the LED light superimposed upon the primary optical path of an observed object.

FIG. 6 depicts the cylindrical view presented to an observer comprising the LED light of the secondary optical path 44 superimposed upon an image 98 transferred through the reflected primary optical path 28. The LED light rays 44 are shown positioned peripherally with respect to the image 98 of the observed object. Also, the diameter of the LED light ray bundle 44 is larger than the diameter of the pinhole 80 for several reasons. First, the LED light emitted from the pinhole 80 is displaced somewhat from the focal point 54 of the mirrored surface 78, thereby defocusing the light ray bundle of the secondary optical path 44 to a certain degree. Secondly, lens 58 may be part of a diopter assembly which provides individual optical correction of the image to the eye 62. Thus, lens 58 may also provide a defocusing effect to the eye 62 of the LED light source ray bundle 44. In actual practice, the light ray bundle forming the secondary optical path 44 may appear to the eye with a diameter of about ¼ inch.

In accordance with another important feature of the invention, when the LED indicator 40 is not illuminated, the pinhole 80 is barely perceptible as a dark spot to the eye 62. The reason for this is that the diameter of the pinhole 80 is exceedingly small, and the polished surface 82 of the glass within the pinhole is yet effective to reflect some of the incident light from the primary optical path 22. Therefore, the removal of the reflective mirror coating 78 has minimal effect on the quality of the image reflected therefrom.

From the foregoing, it can be seen that there is disclosed an optical structure for integrating the ray bundle of an indicator light source into the light bundle of an image without compromising the quality of transmission of the image. A plurality of parameters may be visually displayed by LED indicator lights to an observer in the same field of vision as the image of an object. The LED indicators are fixed to the turning mirrors in particular positions with respect to the pinholes in the mirrored finish so that the light emitted from the LED enters the ray bundle of the reflected primary optical path so as to be colinear therewith. The LED indicators and associated pinholes are also located on the respective turning mirrors in positions such that the ray bundle of the LED light source is superimposed in a peripheral position with respect to the reflected primary optical path.

Although the preferred embodiment of the invention has been described in detail, it should be understood that various changes, substitutions and alterations can be made therein without departing from the spirit and scope of the invention as defined by the appended claims.

What is claimed is:

1. An optical system for integrating light from a multicolor light source into an optical image path to an eye of an observer, comprising:
    a transparent solid having an opaque reflective surface disposed in the optical image path, said solid including a transparent spot formed within said opaque surface;
    a focusing element for focusing an image transferred through the optical image path and reflected from said reflected surface, a focal point of said image caused by said focusing element disposed at a location near said spot; and
    a multicolor integral light source for transmitting light from within said solid through said spot such that light is emitted colinear with the image reflected from said reflective surface, said light source operable to selectively emit each of a plurality of colors of light to indicate different conditions to the observer.

2. An optical system for integrating light from a light source into an optical image path, comprising:
    a transparent solid having an opaque reflective surface disposed in the optical image path, said solid including a small transparent spot formed within said opaque surface;
    a focusing element for focusing an image transferred through the optical image path and reflected from said reflective surface, a focal point of said image caused by said element disposed at a location near to but displaced from said spot; and
    means for transmitting light from behind said reflective surface through said spot such that light is emitted colinear with the image reflected from said reflective surface, said light defocussed into a small region of said image substantially larger in apparent area than said spot.

3. The optical system of claim 2 wherein said reflective surface, said focusing element and said spot are constructed so that the cross-sectional area of the light within said image is less than 1% of the cross-sectional area of said image.

4. The optical system of claim 2 further including in combination a twin eyepiece optical system with individual eyepieces for viewing the image, a respective focusing element, a respective transparent spot, a respective means for transmitting light and a respective reflective surface associated with each said eyepiece so that a parameter indicated by one of said means for transmitting light can be displayed with the image in each eyepiece.

5. The optical system of claim 4 wherein said light is color-coded to indicate one of a plurality of parameters corresponding to the number of colors.

6. The optical system of claim 2 wherein said spot is disposed off-center with respect to a central part of said reflective surface.

7. The optical device of claim 2 wherein the spot is polished to provide a transparent reflective surface.

8. The optical device of claim 2 wherein said means for transmitting light comprises an LED light source disposed behind said area.

9. The optical device of claim 8 wherein said light source is spaced away from the reflective surface and offset with respect to said area so that the light passing through the transparent area emerges on the front side of the reflective surface in alignment with the ray bundle reflected from the reflected surface.

10. The optical device of claim 2 wherein said reflective surface comprises a mirrored finish, and said spot comprises an area etched through said finish.

11. The optical system of claim 2 wherein said means for transmitting light comprises an integral light source disposed behind the reflective surface, said light source operable to selectively transmit each of a plurality of lights, each light being of a different color.

12. The optical system of claim 2 wherein said spot is about 0.01 inch in diameter.

13. The optical system of claim 2 wherein said solid comprises glass, and further including a cavity in said glass adjacent said spot for housing a light source to provide said light.

14. The optical system of claim 13 wherein said light source comprises an LED fixed in said cavity.

15. The optical system of claim 13 wherein said cavity comprises a bore having an axis, and wherein said spot is displaced on the reflective surface radially from said axis.

16. The optical system of claim 2, wherein said means for transmitting light is operable to selectively transmit light responsive to a preselected condition occurring in said optical system.

17. The optical system of claim 16 wherein said spot is located a small distance from the spatial focal point of said image caused by said focusing element.

18. The optical device of claim 2 wherein said optical system comprises a night vision goggle.

19. A turning mirror for use in an optical system for redirecting an image of an optical path, and for integrating a visual indication with the image, comprising:
  a solid having a reflective surface disposed in the optical ppath for redirecting the image from an incident direction to a reflected direction, said reflective surface having a void spot, and said solid being substantially transparent adjacent said void spot;
  a light source; and
  a bore in said solid for housing said light source and being contiguous with the transparent part of said solid, the axial axis of said bore being offset with respect to the void spot so that the light emitted by the light source is transmitted through said spot colinear with the reflected image.

20. The turning mirror of claim 19 wherein said void spot is about 0.01 inch in diameter.

21. The turning mirror of claim 19 wherein said bore is offset with respect to a central part of said reflective surface so that the light is superimposed into the image in an offset manner.

22. The turning mirror of claim 19 further including in combination a battery operated optical system, a low voltage detector for detecting when the battery voltage discharges below a predetermined level, and means for coupling the low voltage indication to the light source.

23. The turning mirror of claim 22 further including in combination an infrared light associated with the optical system, and means for coupling an indication of the operation of the infrared light to the light source so that when said infrared light is illuminated, said light source is also illuminated.

* * * * *